(12) United States Patent
Herrmann et al.

(10) Patent No.: US 11,362,371 B2
(45) Date of Patent: Jun. 14, 2022

(54) METHOD FOR MANUFACTURING ELECTRIC VEHICLE BATTERY CELLS WITH POLYMER FRAME SUPPORT

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Mountain View, CA (US); Rouven Scheffler, Hannover (DE)

(73) Assignees: VOLKSWAGEN AG, Wolfsburg (DE); AUDI AG, Ingolstadt (DE); DR. ING. H.C. F. PORSCHE, Stuttgart (DE)

( * ) Notice: Subject to any disclaimer, the term of this patent is extended or adjusted under 35 U.S.C. 154(b) by 377 days.

(21) Appl. No.: 15/432,317

(22) Filed: Feb. 14, 2017

(65) Prior Publication Data

US 2018/0233782 A1 Aug. 16, 2018

(51) Int. Cl.

| H01M 10/0585 | (2010.01) |
|---|---|
| H01M 10/04 | (2006.01) |
| H01M 50/342 | (2021.01) |
| H01M 4/02 | (2006.01) |
| H01M 50/431 | (2021.01) |

(52) U.S. Cl.
CPC ... *H01M 10/0585* (2013.01); *H01M 10/0486* (2013.01); *H01M 50/342* (2021.01); *H01M 50/431* (2021.01); *H01M 2004/029* (2013.01); *H01M 2220/20* (2013.01)

(58) Field of Classification Search
None
See application file for complete search history.

(56) References Cited

U.S. PATENT DOCUMENTS

| 3,819,412 A | 6/1974 | Taylor et al. |
| 4,164,068 A | 8/1979 | Shropshire et al. |
| 4,539,268 A | 9/1985 | Rowlette et al. |
| 4,576,881 A | 3/1986 | Hasenauer et al. |
| 4,737,257 A * | 4/1988 | Boulton ............... H01M 4/86 |
| | | 204/291 |
| 5,518,839 A | 5/1996 | Olsen et al. |

(Continued)

FOREIGN PATENT DOCUMENTS

| CA | 2835915 A1 | 11/2012 |
| CN | 1303525 A | 7/2001 |

(Continued)

OTHER PUBLICATIONS

Definition of fixedly, www.dictionary.com, Oct. 23, 2018 (Year: 2018).

(Continued)

*Primary Examiner* — Haixia Zhang
(74) *Attorney, Agent, or Firm* — Davidson, Davidson & Kappel, LLC

(57) ABSTRACT

A method for manufacturing a battery component includes unrolling a polymer foil from a roll; forming windows into the unrolled polymer foil; and placing a battery cell component over each window. The battery cell component advantageously can be a solid-state electrolyte functioning as a separator, which is thereby well protected for handling and in later use.

20 Claims, 6 Drawing Sheets

(56) References Cited

U.S. PATENT DOCUMENTS

| | | | |
|---|---|---|---|
| 5,618,641 A | 4/1997 | Arias et al. | |
| 5,688,615 A | 11/1997 | Mrotek et al. | |
| 6,022,642 A | 2/2000 | Tsukamoto et al. | |
| 6,576,365 B1 | 6/2003 | Meitav et al. | |
| 6,696,204 B2 | 2/2004 | Sate et al. | |
| 6,743,546 B1 | 6/2004 | Kaneda et al. | |
| 7,097,937 B2 | 8/2006 | Fredriksson et al. | |
| 7,648,538 B2 | 1/2010 | Oogami et al. | |
| 7,824,806 B2 | 11/2010 | Visco et al. | |
| 8,415,049 B2 | 4/2013 | Shimamura et al. | |
| 9,362,547 B2 | 6/2016 | Sabi et al. | |
| 9,818,996 B2 | 11/2017 | Miyake | |
| 2002/0192542 A1 | 12/2002 | Luski et al. | |
| 2003/0013012 A1 | 1/2003 | Ahn et al. | |
| 2003/0041444 A1 | 3/2003 | Debe et al. | |
| 2003/0194605 A1* | 10/2003 | Fauteux | H01M 2/26 429/149 |
| 2004/0067417 A1 | 4/2004 | Oosawa et al. | |
| 2004/0091771 A1 | 5/2004 | Hosaka et al. | |
| 2004/0241525 A1 | 12/2004 | Mekala et al. | |
| 2004/0253512 A1 | 12/2004 | Watanabe et al. | |
| 2005/0089751 A1 | 4/2005 | Oogami et al. | |
| 2006/0134502 A1 | 6/2006 | Garceau et al. | |
| 2008/0003493 A1 | 1/2008 | Bates et al. | |
| 2009/0233164 A1* | 9/2009 | Shimamura | H01M 2/08 429/149 |
| 2011/0014520 A1 | 1/2011 | Ueda et al. | |
| 2011/0206974 A1* | 8/2011 | Inoue | H01M 4/043 429/149 |
| 2011/0217595 A1 | 9/2011 | Kelnberger | |
| 2011/0308935 A1* | 12/2011 | Yamazaki | C23C 14/0676 204/192.1 |
| 2012/0115020 A1 | 5/2012 | Hwang et al. | |
| 2013/0065110 A1 | 3/2013 | Faust et al. | |
| 2013/0101878 A1 | 4/2013 | Pilgram | |
| 2013/0108899 A1 | 5/2013 | Schaefer | |
| 2013/0157111 A1 | 6/2013 | Chamie et al. | |
| 2013/0162216 A1 | 6/2013 | Zhamu et al. | |
| 2013/0302695 A1 | 11/2013 | Beer et al. | |
| 2014/0045040 A1 | 2/2014 | Chami et al. | |
| 2014/0178745 A1 | 6/2014 | Kwon et al. | |
| 2014/0329126 A1 | 11/2014 | Ho et al. | |
| 2014/0349147 A1 | 11/2014 | Shaffer, II et al. | |
| 2014/0363748 A1 | 12/2014 | Kritzer et al. | |
| 2015/0044576 A1 | 2/2015 | Eisele et al. | |
| 2015/0050537 A1 | 2/2015 | Christensen et al. | |
| 2015/0093627 A1 | 4/2015 | Busch et al. | |
| 2015/0280177 A1 | 10/2015 | Keates | |
| 2016/0028134 A1 | 1/2016 | Takechi et al. | |
| 2016/0104913 A1 | 4/2016 | Moreau | |
| 2016/0141623 A1 | 5/2016 | Yoon et al. | |
| 2016/0156065 A1 | 6/2016 | Visco et al. | |
| 2016/0329535 A1 | 11/2016 | Moonmaw et al. | |
| 2017/0263951 A1 | 9/2017 | Kanno et al. | |
| 2017/0294662 A1 | 10/2017 | Madden et al. | |
| 2017/0294672 A1* | 10/2017 | Warrington | H01M 8/2404 |
| 2018/0233721 A1 | 8/2018 | Herrmann et al. | |
| 2018/0233752 A1 | 8/2018 | Herrmann et al. | |
| 2018/0233768 A1 | 8/2018 | Herrmann et al. | |
| 2019/0044129 A1 | 2/2019 | Yadav | |

FOREIGN PATENT DOCUMENTS

| | | |
|---|---|---|
| CN | 1337757 A | 2/2002 |
| CN | 1408128 A | 4/2003 |
| CN | 1499664 A | 5/2004 |
| CN | 1619859 A | 5/2005 |
| CN | 1795575 A | 6/2006 |
| CN | 1912522 | 2/2007 |
| CN | 101076915 | 11/2007 |
| CN | 103334147 | 10/2013 |
| CN | 103443994 A | 12/2013 |
| CN | 103730684 A | 4/2014 |
| CN | 103959507 A | 4/2014 |
| CN | 103840212 A | 6/2014 |
| DE | 102010013031 A1 | 9/2011 |
| DE | 102011003186 A1 | 7/2012 |
| DE | 102012213110 A1 | 1/2014 |
| DE | 102015102688 A1 | 10/2015 |
| DE | 102015210806 A1 | 5/2016 |
| EP | 1487034 A2 | 12/2004 |
| EP | 1841001 | 10/2007 |
| EP | 1175709 B1 | 11/2009 |
| EP | 2609643 B1 | 6/2014 |
| EP | 2804697 A1 | 11/2014 |
| EP | 2843734 A2 | 3/2015 |
| EP | 1766716 B1 | 4/2015 |
| GB | 2477552 | 8/2011 |
| JP | 2005-259379 | 9/2005 |
| JP | 2005259379 | 9/2005 |
| JP | 2009117052 A | 5/2009 |
| JP | 2010277811 | 12/2010 |
| KR | 20080036139 A | 4/2008 |
| WO | WO9210861 | 6/1992 |
| WO | WO 1997038461 A1 | 10/1997 |
| WO | WO2009029746 | 3/2009 |
| WO | WO2009029746 A1 | 3/2009 |
| WO | WO 2010049478 A1 | 5/2010 |
| WO | WO2010124195 A1 | 10/2010 |
| WO | WO 2011134613 A1 | 11/2011 |
| WO | WO2013127573 A1 | 9/2013 |
| WO | WO 2013131624 A1 | 9/2013 |
| WO | WO 2015/083825 | 6/2015 |
| WO | WO2016/057457 | 4/2016 |

OTHER PUBLICATIONS

Definition of connected, www.google.com, Oct. 23, 2018 (Year: 2018).

Key technologies for electric motorization, downloaded from http://www.toyota-global.com/innovation/environmental_technology/keytech/, 5 pages, downloaded on Feb. 14, 2017.

* cited by examiner

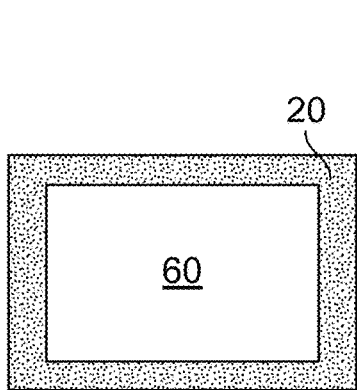
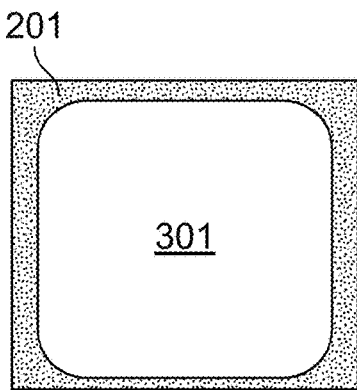
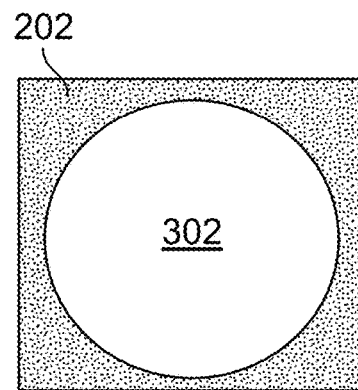
FIG. 4A    FIG. 4B    FIG. 4C
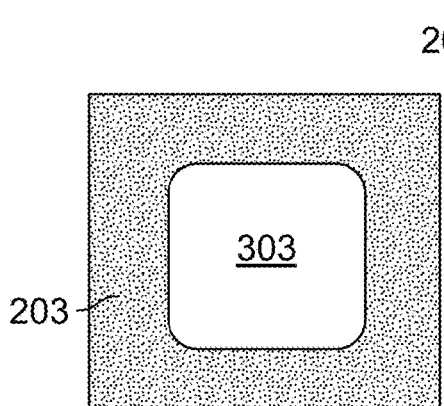
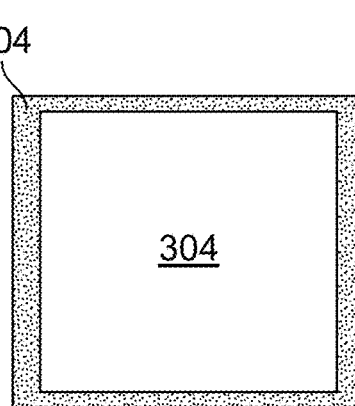
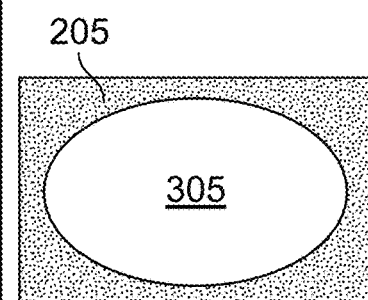
FIG. 4D    FIG. 4E    FIG. 4F
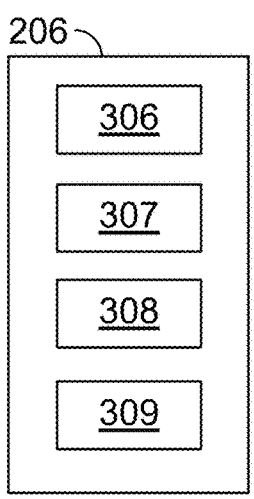
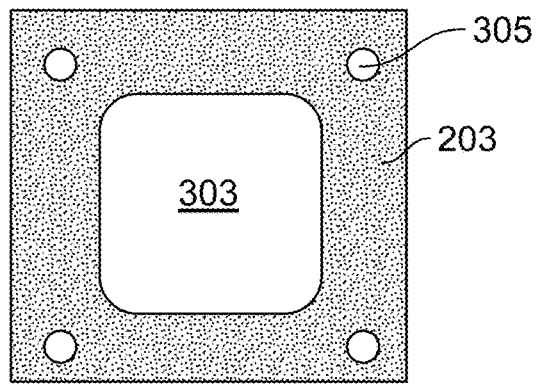
FIG. 4G    FIG. 5

METHOD FOR MANUFACTURING ELECTRIC VEHICLE BATTERY CELLS WITH POLYMER FRAME SUPPORT

FIELD OF THE INVENTION

The present invention relates generally to electric vehicles and more particularly to method for manufacturing batteries for electric vehicles.

BACKGROUND

PCT Publication WO 2015/083825 discloses a method for manufacturing a non-aqueous electrolyte battery. The non-aqueous process for producing an electrolyte battery prepares a band-shaped first separator including a heat resistant layer and the non-heat-resistant layer, and a strip-like second separator comprising a heat-resistant layer and the non-heat-resistant layer. In a separator preparation step, a positive electrode is arranged on the heat-resistant layer of the first separator, and there is a separator laminating step of disposing a second separator, the separator contacting the said first separator and said second separator along outer shape of the positive electrode of the separator. In a separator welding step of forming a bag-like separator, parts are thermally welded by the contact portion between the first separator and the second separator, for example by impulse welding under pressure by the heating element.

U.S. Patent Application No. 2016/0156065 and WO 2009/029746 disclose other manufacturing methods for batteries with solid state electrolytes.

U.S. Patent Application No. 2016/0141623 discloses a bipolar electrode having a solid electrolyte, an anode slurry and a cathode slurry, each of which may be provided on a first surface and a second surface of the solid electrolyte, respectively, spacers provided in the anode slurry and the cathode slurry, and a metal substrate provided on the anode slurry and the cathode slurry. The electrode can be dried and pressed, and stacked to form an all-solid state battery.

SUMMARY OF THE INVENTION

The present invention provides a method for manufacturing a battery component comprising:
unrolling a polymer foil from a roll;
forming a window into the unrolled polymer foil to create a polymer frame; and
placing a battery cell component over the window.

The present invention advantageously creates an easy manufacturing method for a battery component that then is well protected, easily handled and easy to assemble.

The polymer foil can be a dense foil, perforated foil, porous foil, adhesive tape or adhesive foil, and maybe for example be made of polyethylene, polypropylene or a mixture of the two.

The polymer frame preferably is connected to either a separator or a bipolar current collector of the battery cell component, via for example an attachment with gluing, welding, heat bonding, lamination or with an additional adhesive tape to the separator, or via a friction fit. However merely placement is also possible as the connection, without an attachment.

A second polymer frame may be provided on another side of the separator, resulting in a polymer frame—separator—second polymer frame unit.

If attached to the bipolar current collector, a nickel-coated side of an aluminum bipolar current collector can be attached directly to the frame.

The polymer frame window can have the shape of a rectangle, a rectangle with rounded edges, a circle, an oval or a triangle, and is preferably stamped out of the polymer foil.

One advantage of the present invention is the ability to use solid-state electrolytes as the separator. The method thus preferably includes that at least one solid state electrolyte is used as the separator.

The polymer frame for example may have at least one feed hole, most preferably four, that for example can fit over rods to aid in processing the stack.

The present invention advantageously can increase the battery mechanical stability, especially at the battery cell edges, and also can enable a separation of anode and cathode compartments.

The present invention also provides a method for manufacturing a battery stack comprising:
unrolling a polymer foil from a roll;
forming windows into the unrolled polymer foil;
placing a battery cell component over each window, the battery cell component including a separator or a bipolar current collector; and
folding the polymer foil between two battery components or cutting the polymer foil between two battery components, so that the two battery components form a stack with the polymer foil in between.

The present invention also allows easy handling of the battery cell components, such as brittle electrolyte material used as the separator, and thus also provides a method for handling battery components comprising moving the battery component of the present invention as an individual component via the polymer frame.

BRIEF DESCRIPTION OF THE DRAWINGS

The following describe several nonlimiting embodiments of the present invention, in which:

FIGS. 4a, 4b, 4c, 4d, 4e and 4f show various frame geometries of the polymer frame according to the present invention, and FIG. 4g shows a frame with a plurality of windows.

FIG. 5 shows a polymer frame according to the present invention with feed holes for easing assembly;

DETAILED DESCRIPTION OF THE PREFERRED EMBODIMENTS

Figure 1:
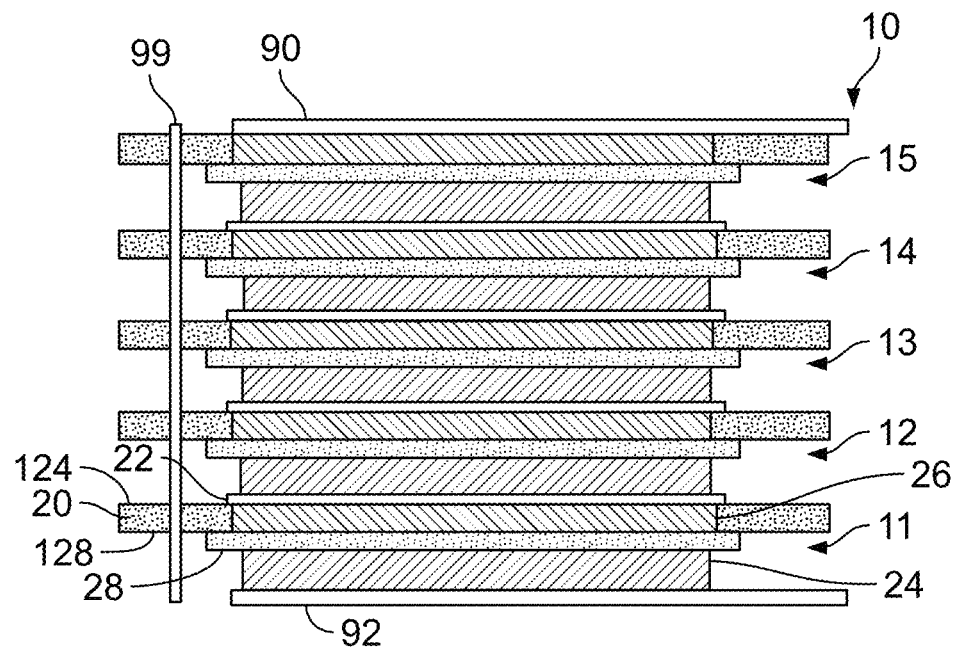
FIG. 1 shows a side view of a plurality of stacked battery components in a first embodiment of the present invention.

FIG. 1 shows a battery cell module 10 with five stackable battery components 11, 12, 13, 14, 15 having electrode components according to an embodiment of the present invention.

Each battery component 11, 12, 13, 14, 15 includes an anode 24, a separator 28, a cathode 26 and a bipolar current collector 22. Each component also includes a polymer frame 20, which on a planar side 124 has the bipolar current collector 22 and on an opposite planar side 128 has the separator 28. Polymer frame 20 in this embodiment is a polymer foil, and the attachment of separator 28 to frame 20 will be described in more detail with respect to FIGS. 3a, 3b and 3c.

Separator 28 can be a dielectric material, for example a porous polyethylene or polyethylene-polypropylene foil (typically 8 to 25 μm thickness).

Polymer frame 20 can be made for example of polypropylene (PP), polyethylene (PE), acrylnitrile butadiene-styrene (ABS), polyamide (PA), polylactic acid (PLA), poly (methyl methacrylate) (PMMA), polycarbonate (PC), polyethylene terephthalate (PET), polystyrene (PS), polyvinyl chloride (PVC), polyphenylene sulfide (PPS), polyphenylene oxide (PPO), Polyetherimide (PEI), polyether ether ketone (PEEK), polyether sulfone (PES), polybenzimidazole (PBI), nylon and composite foil or multilayer foil made of aluminum foil coated with a polymer for example polypropylene. Most preferably, the polymer frame is a PE/PP mixture.

While typical electrolytes such as liquids or gels may be used, the present invention also can incorporate solid-state electrolytes like lithium oxide or sulfide glasses or glass ceramics or ceramics as electrolytes. Bipolar current collector 22 can be made of copper or aluminum or nickel-coated aluminum or nickel for example. Anode 24 and cathode 26 can be deposited for example by vapor deposition or other film technology on separator 28. Bipolar current collector 22 can be connected to cathode 26 as described below.

Figure 2:
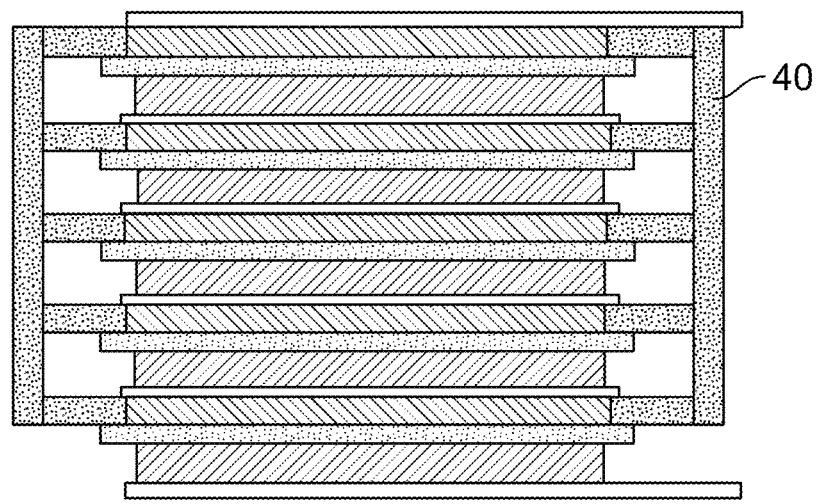
FIG. 2 shows a side view of the embodiment of FIG. 1 with a housing connected to the polymer frames of the battery components to form a battery module cell.

FIG. 2 shows a side view of the embodiment of FIG. 1 with a housing 40 connected to the polymer frames 20 of the battery components 11 to 15 to form a battery module cell. The housing can have for example four walls to cover each side of polymer frames 20, which preferably have a rectangular outer shape.

Housing 40 may be made of the same material as polymer frames 20 for example, or of a different polymer material.

A rod 99 as shown in FIG. 1 can interact with feed holes in the polymer frames 20 as will be described, and can be removed after the stack is created and the housing is added.

Figure 3A:
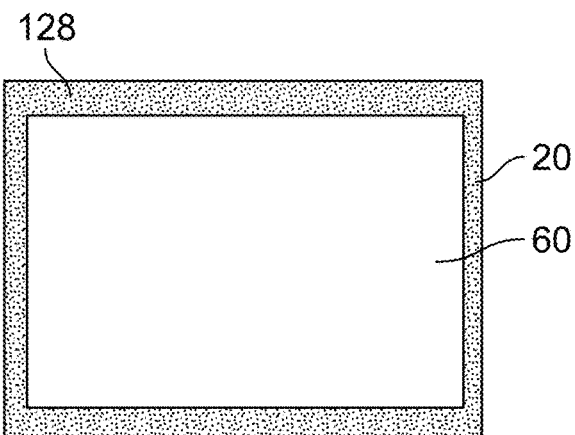
FIGS. 3a, 3b, 3c show a top view of creation of the embodiment of the battery component of the present invention.
Figure 3B:
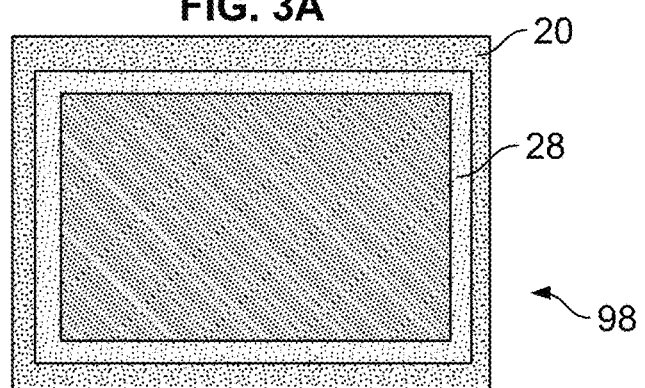
Figure 3C:
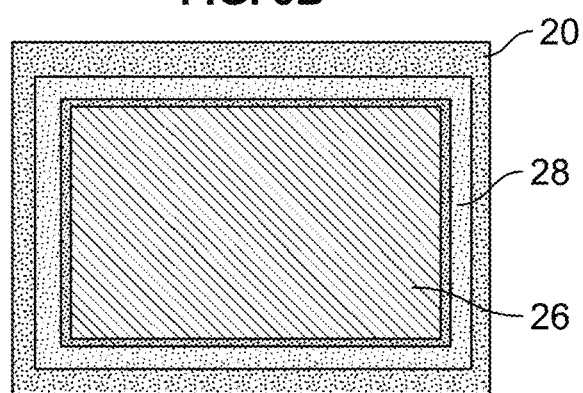
Figure 3D:
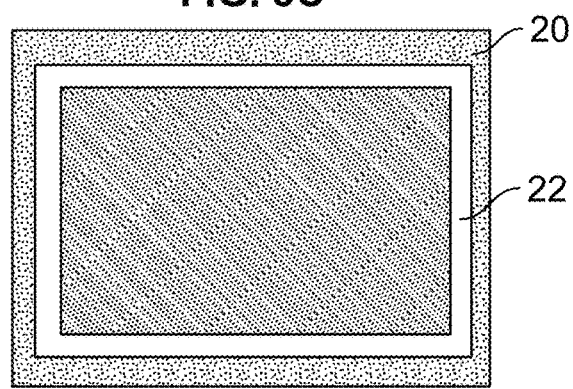
FIG. 3d shows an alternate embodiment of the battery component.

FIGS. 3a, 3b and 3c show a top view of creation of the embodiment of the battery component of the present invention, and FIG. 3d shows an alternate battery component with the bipolar current collector 22 first connected to the polymer frame.

FIG. 3a shows a side 128 of a polymer frame 20 with a rectangular window 60.

As shown in FIG. 3b, frame 20 can be placed over separator 28, which can have an anode 24 on one side and cathode 26 on the other side as shown in FIG. 1. Cathode 26 protrudes through window 60, as shown in FIG. 3c. Bipolar current collector 22, which can be a thin metal foil, then can be added over cathode 26 and attached to the frame 20 at its edges. Frame 20 likewise is attached to separator 28 around window 60.

Frame 20 and separator 28, fixedly connected, thus create an easily stackable battery component 98. Bipolar current collector 22, anode 24 and cathode 26 can be connected to this stackable component as discussed above or also can added separately or later during assembly.

The anode and the cathode advantageously can be made of polymer, glass, glass ceramic or ceramic solid-state materials, and the mechanical properties are improved and much of the mechanical stress during the cell assembly process can be retained by the polymer frame, which lowers the requirements on the assembly process. In addition, small imperfections at the solid-state material edges can be tolerated and the amount of defective goods can be decreased.

In addition, the separator can be a solid state electrolyte, so that liquid or gels need not be added later as in polymer separators.

FIG. 3d shows an alternate embodiment which starts out with the same frame 20 as in FIG. 3a. Bipolar current collector 22, which can be a thin foil of aluminum coated with nickel, is placed nickel side down on the frame to overlap side 128. Gluing or other bonding can be used to attach the nickel coating to a PP/PE frame, which advantageously provides a stable connection compares to a PP/PE aluminum or copper connection. The thin foil of the current collector 22 is also stabilized well, and then the cathode 26, separator 28 and anode 24 can be added separately to the combined frame 20/current collector 22 component.

FIGS. 4a, 4b, 4c, 4d, 4e and 4f show various frame geometries of the polymer frames according to the present invention, with FIG. 4a being similar to FIG. 3a, and frames 201, 202, 203, 204, 205 having a window 301 with rounded edges, a circular window 302, a window 303 similar to window 301 but smaller for a same outer sized frame, a perfectly square window 304 and an oval window 305, respectively.

FIG. 4g shows a polymer frame 206 with for example four windows 306, 307, 308, 309.

FIG. 5 shows a polymer frame 203 according to the present invention with feed holes 305 for easing assembly.

Assembly of the FIG. 1 embodiment can occur as follows: endplate anode current collector 92 is provided, and then battery component 11 is added so that frame 20 is slid over rod 99 via a feed hole 305. Polymer frame 20 can be slid over further rods via feed holes 305. Components 12, 13, 14 and 15 then can be stacked over the rod 99 as shown in FIG. 1, and finally cathode top plate 90 added to create the battery module 10. The anode 24 of a battery component 12, 13, 14, 15 thus can rest on the bipolar current collector 22 of the battery component 11, 12, 13, 14, respectively, below.

To create the FIG. 2 embodiment the rod 99 can be removed and housing 40 sides can be added and attached to the polymer frames. If a liquid electrolyte/polymer separator is being used, liquid electrolyte can be added to the areas formed by the housing and two polymer frames if desirable to increase efficiency.

Figure 6:
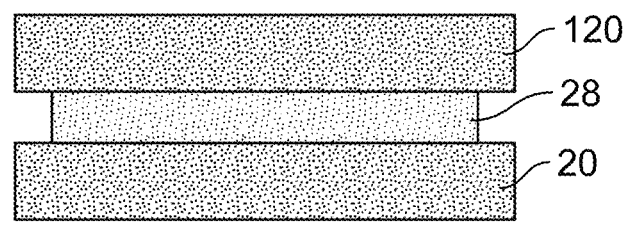
FIG. 6 shows a side view of a different embodiment of the battery component with two frames.

FIG. 6 shows a side view of a different embodiment of the battery component with an additional polymer frame 120 attached to the separator 28 opposite the polymer frame 20. This embodiment provide additional stability and protection.

Figure 7:
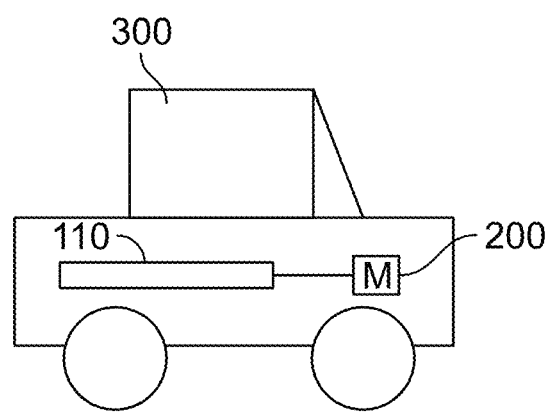
FIG. 7 shows schematically a electric or hybrid vehicle with an electric battery made of the battery module cells.

As shown in FIG. 7, in one application, the battery cell module or stack 110 can be created for example with a much larger number of battery cells for providing power as an electric battery to an electric motor 200 for powering an electric vehicle 300.

Figure 8:
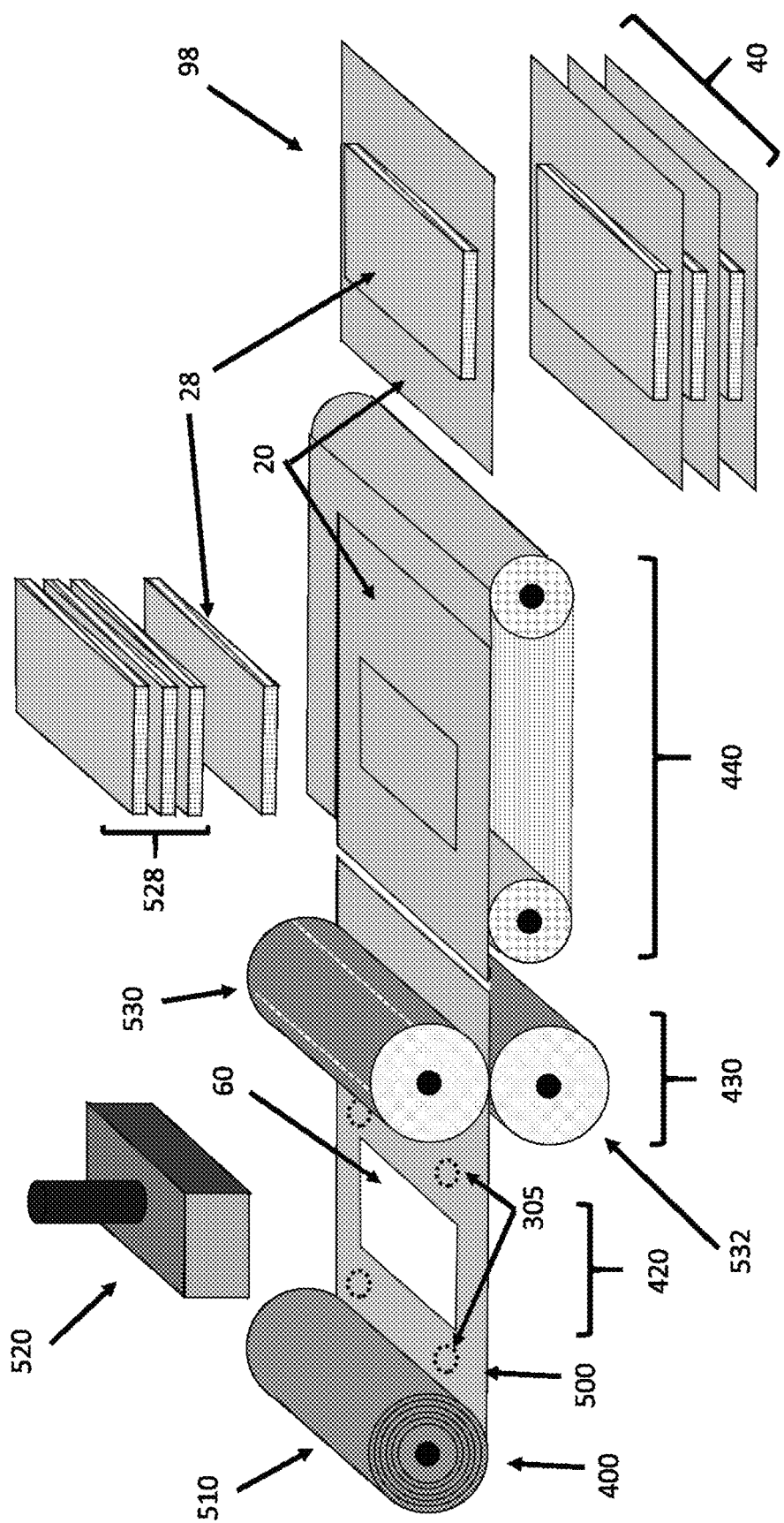
FIG. 8 shows one embodiment of the method of the present invention, using the rods and individual stacked components to manufacture battery cell modules as in FIG. 1.

FIG. 8 shows one embodiment of a manufacturing method according to the present invention. In a roll stand 400, a polymer foil roll 510 is unwound so that a polymer foil 500 exits the roll stand 400. In a stamping station 420, a die 520 stamps windows 60 into the foil 500. At this point feed holes 305 if desired can also be stamped. As an alternate to a stamping station, the windows and/or feed holes could be laser cut or otherwise impart on foil 500. At a cut station 430, the foil 500 is cut into individual polymer frames 20 via for example a knife roller 530 and anvil 532, the frames 20 with windows 60 exiting onto a conveyor 440. Separators 28 from a stack 528, which separators can be made of solid-state electrolyte material, can be placed on the frames 20 to form stackable components 98 which can be assembled in a housing 40 with the other battery cell components, such as the bipolar current collectors 22, as described above. Alternately polymer separators could be used as described for example in FIG. 9 below. Rods 99 can be used and welding or other attachment processes described above can be used to complete the battery module.

Figure 9:
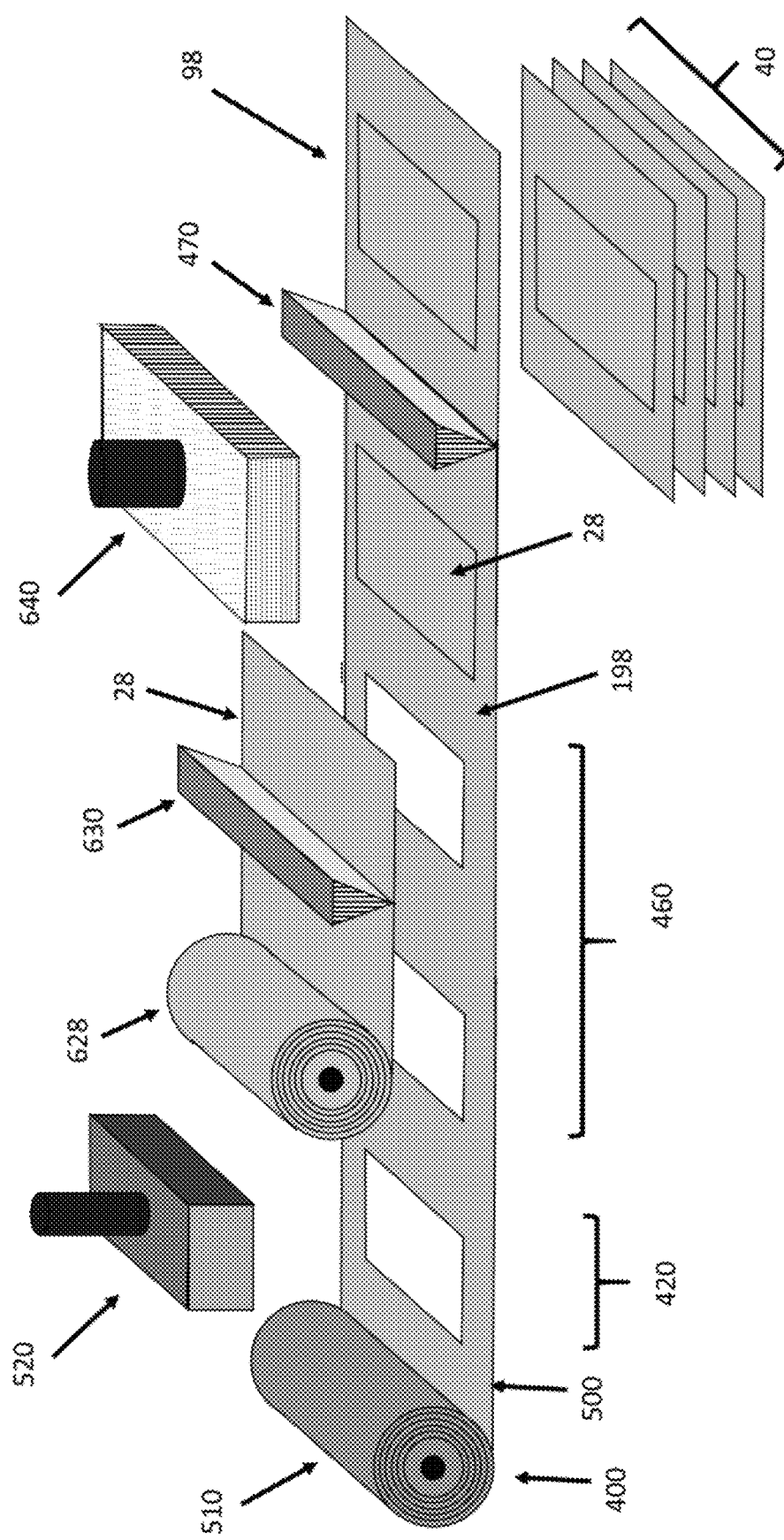
FIG. 9 shows an alternate embodiment of the method of the present invention.

FIG. 9 shows a different embodiment where separator material is added at a separator placement station 460 before cutting endless tape 198 so that an endless tape 198 of frame supported separators 28 is created. Solid-state separators can be used as in the FIG. 8 embodiment, or polymer separators cut off a roll 628 by a cutting device 630 could be used. The separators 28 can be attached for example by a welding device 640 to the tape 198.

Rather than the separators 28, the bipolar current collectors 22 also could replace the separator material in the FIG. 9 embodiment and be attached directly via for example welding to the foil 500. In this case the separators and anodes and cathodes could be added later.

The endless tape 198 also could be used for zig-zag folding or a combination of zig-zag and stacking.

The endless tape 198 also could be cut into smaller units down to single units of a stackable component 98 via a cutting device (knife or laser cutter) 470.

By attaching the separator-polymer frame unit to the housing the separator can no longer move or slide inside the cell. Therefore, this unit is more resilient and can better tolerate vibrations or shocks as they occur when having batteries in cars or any transportable device, because the position of the whole cell stack is fixed inside the cell.

Likewise if the bipolar current collector-polymer frame unit embodiment is used, the bipolar current collector is well protected.

The housing 40 also could be dispensed with and the frames 60 simply welded together.

The method of the present invention and resulting stable batteries are especially useful for electric vehicle or hybrid vehicle batteries, which are subjected of significant vibrations.

What is claimed is:

1. A method for manufacturing a battery component comprising:
    unrolling a polymer foil from a roll;
    forming windows into the unrolled polymer foil, the windows including a first window and a second window,
    the polymer foil being formed into a plurality of frames including a first frame including the first window and a second frame including the second window, wherein a first current collector is attached directly to a first planar surface of the first frame and a first separator contacts a second planar surface of the first frame opposite the first planar surface of the first frame, and a second current collector is attached directly to a first planar surface of the second frame and a second separator contacts a second planar surface of the second frame opposite the first planar surface of the second frame; and
    stacking a first battery cell component including the first separator and the first current collector onto a second battery cell component including the second separator and the second current collector, the first frame extending further laterally than the first separator and the first current collector, the second frame extending further laterally than the second separator and the second current collector, wherein the first battery cell component is stacked onto the second battery cell component such that the first frame is not in contact with the second frame, and the first frame is separated from the second frame by a gap.

2. The method as recited in claim 1, wherein the polymer foil is made of polyethylene or polypropylene.

3. The method as recited in claim 1, wherein the first separator and the second separator each include a solid-state electrolyte.

4. The method as recited in claim 1, wherein the first separator and the second separator each include a polymer and further comprising adding liquid or gel electrolyte to each of the first and second separators.

5. The method as recited in claim 1, wherein the first battery cell component includes the first current collector in a form of a first nickel foil bipolar current collector attached directly to the first frame or a nickel-coated side of a first aluminum bipolar current collector attached directly to the first frame, and the second battery cell component includes the second current collector in a form of a second nickel foil bipolar current collector attached directly to the second frame or a nickel-coated side of a second aluminum bipolar current collector attached directly to the second frame.

6. The method as recited in claim 1, further comprising cutting the polymer foil between two windows.

7. The method as recited in claim 6, wherein the first current collector attached directly to the first planar surface of the first frame is placed over the first window after the cutting, and the second separator attached directly to the second planar surface of the second frame is placed over the second window after the cutting.

8. The method as recited in claim 6, wherein the first current collector attached directly to the first planar surface of the first frame is placed over the first window before the cutting, and the second separator attached directly to the second planar surface of the second frame is placed over the second window before the cutting.

9. The method as recited in claim 1 wherein the first separator and the second separator are attached to the polymer foil prior to the polymer foil being formed into the plurality of frames.

10. The method as recited in claim 1, wherein the battery component is used in an electric vehicle.

11. The method as recited in claim 1, further comprising fixing first polymer housing walls to outer edges of the first frame and fixing second polymer housing walls to outer edges of the second frame after the stacking of the first battery cell component onto the second battery cell component.

12. The method as recited in claim 1, wherein the first battery cell component includes a first electrode in the first window and contacting a first planar surface of the first current collector attached directly to the first planar surface of the first frame, the first electrode of the first battery cell component being a cathode, and the second battery cell component includes a first electrode in the second window and contacting a first planar surface of the second separator attached directly to the second planar surface of the second frame, the first electrode of the second battery cell component being a cathode.

13. The method as recited in claim 12, wherein the first battery cell component includes the first separator contacting the first frame such that the first electrode of the first battery cell component is on a first planar surface of the first separator, and the second battery cell component includes the second separator contacting the second frame such that the first electrode of the second battery cell component is on a first planar surface of the second separator.

14. The method as recited in claim 13, further comprising depositing the first electrode on the first separator.

15. The method as recited in claim 14, wherein the depositing of the first electrode on the first separator is via vapor deposition.

16. The method as recited in claim 13, wherein the first battery cell component includes a second electrode on a second planar side of the first separator opposite the first planar side of the first separator, and the second battery cell component includes a second electrode on a second planar side of the second separator opposite the first planar side of the second separator, each of the second electrodes being a respective anode.

17. The method as recited in claim 16, further comprising stacking the second battery cell component on an endplate current collector such that the second electrode of the second battery cell component contacts the endplate current collector.

18. The method as recited in claim 17, further comprising, prior to the stacking of the first battery cell component onto the second battery cell component, performing the following:
    connecting the second frame to the first electrode or the second electrode of the second battery cell component; and then
    sliding the second frame onto a rod.

19. The method as recited in claim 18, further comprising removing the rod and fixing polymer housing walls to outer edges of each of the first and frame and the second frame.

20. The method as recited in claim 1 wherein the first separator and the second separator are attached to the respective first frame and the respective second frame after the polymer foil is formed into the plurality of frames.

* * * * *